US012753793B2

(12) United States Patent
Goedl

(10) Patent No.: US 12,753,793 B2
(45) Date of Patent: Oct. 6, 2026

(54) ROLLER FLANGE, EXTERNAL ROTOR MOTOR AND CONVEYOR ROLLER

(71) Applicant: LOGICDATA Electronic & Software Entwicklungs GmbH, Deutschlandsberg (AT)

(72) Inventor: Philipp Goedl, Seiersberg-Pirka (AT)

(73) Assignee: LOGICDATA Electronic & Software Entwicklungs GmbH, Deutschlandsberg (AT)

( * ) Notice: Subject to any disclaimer, the term of this patent is extended or adjusted under 35 U.S.C. 154(b) by 0 days.

(21) Appl. No.: 19/014,293

(22) Filed: Jan. 9, 2025

(65) Prior Publication Data

US 2025/0230838 A1 Jul. 17, 2025

(30) Foreign Application Priority Data

Jan. 17, 2024 (DE) ..................... 10 2024 101 288.9

(51) Int. Cl.
*F16C 13/02* (2006.01)

(52) U.S. Cl.
CPC .......... *F16C 13/02* (2013.01); *F16C 2226/12* (2013.01); *F16C 2226/62* (2013.01); *F16C 2326/58* (2013.01); *F16C 2380/26* (2013.01)

(58) Field of Classification Search
CPC ............................... F16C 27/06; F16C 13/022
See application file for complete search history.

(56) References Cited

U.S. PATENT DOCUMENTS 1,710,999 A 4/1929 Schmid
3,075,632 A * 1/1963 Watt ....................... B65G 39/14 492/16
3,567,973 A 3/1971 Mastrodonato, Sr et al.
3,732,616 A 5/1973 Alfred, Sr. et al.
3,793,689 A 2/1974 Specth
8,944,138 B2 2/2015 Feldstein et al.
9,121,441 B2 * 9/2015 Pickel ..................... F16C 35/07
9,493,305 B2 * 11/2016 Weichbrodt ........... B65G 13/02
2014/0251765 A1 9/2014 Weichbrodt et al.
(Continued)

FOREIGN PATENT DOCUMENTS

AT 511630 A1 1/2013
DE 2205242 A1 8/1973
DE 202009005878 U1 7/2009
(Continued)

OTHER PUBLICATIONS

English Machine Translation of DE102013110998A1 (Year: 2015).*
English Machine Translation of DE202009005878U1 (Year: 2009).*

*Primary Examiner* — Sarang Afzali
(74) *Attorney, Agent, or Firm* — Eschweiler & Potashnik, LLC

(57) ABSTRACT

A roller flange for mounting on an end face of a cylindrical or drum-shaped roller comprises a substantially annular plastic body, a bearing and a metallic ring surrounding the bearing. The ring and the bearing are at least partially embedded in the plastic body. The ring has elements for force transmission, which are positioned distributed at or on a surface of the plastic body. The elements for force transmission comprise at least one locking means for transmitting an axial force between the roller and the roller flange, and at least one pin for transmitting a radial force between the roller and the roller flange.

15 Claims, 10 Drawing Sheets

(56) References Cited

U.S. PATENT DOCUMENTS

| | | | |
|---|---|---|---|
| 2020/0399959 | A1 | 12/2020 | Buccola, Jr. et al. |

FOREIGN PATENT DOCUMENTS

| | | | |
|---|---|---|---|
| DE | 102008034939 | A1 | 10/2009 |
| DE | 202011105060 | U | 10/2011 |
| DE | 102013110998 | A1 | 4/2015 |
| EP | 2114801 | A1 | 11/2008 |
| EP | 2778100 | A1 | 9/2014 |
| GB | 1478993 | A | 7/1977 |

* cited by examiner

ROLLER FLANGE, EXTERNAL ROTOR MOTOR AND CONVEYOR ROLLER

REFERENCE TO RELATED APPLICATIONS

This Application claims priority to German Application number 10 2024 101 288.9, filed on Jan. 17, 2024. The contents of the above-referenced Patent Applications are hereby incorporated by reference in their entirety.

FIELD

The present disclosure relates to a roller flange, an external rotor motor with such a roller flange and a conveyor roller with such a roller flange.

BACKGROUND

A roller flange is known per se and is mounted, for example, on an end face of cylindrical or drum-shaped rollers. For example, the rollers are rotor rollers of external rotor motors or rollers of driven or non-driven conveyor rollers.

Such conveyor rollers are known per se and are often used in conveyor systems of various kinds, for example in a warehouse, a production facility or even in a distribution system. Such conveyor systems are used for conveying and sorting loads. In conveyor systems with conveyor rollers of this type (roller conveyors), the conveyed goods are transported by individual conveyor rollers that are in temporary contact with the conveyed goods. In addition to electrically driven, motorized conveyor rollers, a conveyor system can also have idle, non-driven conveyor rollers or conveyor rollers that are driven by a motorized conveyor roller via a belt.

Rollers of this type generally consist of a tubular shell and two roller bases fixed in the two ends of this tubular roller shell, in which the roller axle is fixed or rotatably mounted, for example by means of roller bearings. It is a matter of achieving a tight fit of the roller bases in the roller shell both against axial displacement inwards or outwards and against a rotary movement between the roller shell and the roller base. However, it is difficult to achieve this permanently tight fit of the roller bases in the roller shell. If, in conventional implementations, the roller shell and the roller bases are made of different materials, for example the roller shell is made of metal and the roller bases are made of plastic, the connection between the two soon loosens due to different thermal expansion of the different materials.

Particularly in the case of heavily loaded rollers of conventional implementations, the flexing that occurs between the roller shell and the roller bases also loosens the connection between the two, so that a relative rotation occurs between the roller bases and the roller shell, which, once it has occurred, becomes increasingly stronger in continuous operation. A metallic roller base, on the other hand, has a high mass and increases the inertia of the roller.

SUMMARY

The present disclosure provides an improved connection concept for conveyor rollers that eliminates these disadvantages and problems of known rollers.

The improved connection concept makes it possible, for example, to create a roller in which the roller bases are absolutely and permanently firmly anchored in the roller shell in a simple manufacturing manner both against axial displacement and against relative rotation, even if high loads and temperature fluctuations occur, whereby the dimensional tolerances can also remain within economically acceptable limits.

In one embodiment according to the improved connection concept, the roller flange is configured for mounting on an end face of a cylindrical or drum-shaped roller, wherein the roller flange comprises a substantially ring-shaped plastic body, a bearing, and a metallic ring surrounding the bearing. The ring and the bearing are at least partially embedded in the plastic body. The ring has elements for force transmission positioned on or distributed over a surface, for example the circumferential surface, of the plastic body. The elements for force transmission comprise one or more locking means for transmitting an axial force between the roller and the roller flange, for example for axially locking the first roller to the roller flange, and one or more pins for transmitting a radial force between the first roller and the roller flange or vice versa, such as a torque.

The use of metallic elements for force transmission improves the durability and resistance of the roller flange against both axial displacement and relative rotation. By embedding a relatively light metal ring in the plastic body of the roller flange, the mass and inertia of the roller flange is only slightly increased.

In various embodiments, the at least one pin of the roller flange is arranged to form a positive connection with at least one corresponding recess in the roller. This allows a stable transmission of the force or torque to be achieved.

For example, the ring, the bearing, and the plastic body are arranged coaxially to the axis of rotation of the first roller.

In various implementations, the ring is attached to the bearing. This enables simple assembly. This can also be supported by the ring having at least one elastic attachment means, for example legs, which is in contact with the bearing. The elastic attachment means is used, for example, to facilitate the mounting of the ring on the bearing.

In various embodiments, the roller flange comprises at least one pin-like fixing element for fixing a further roller and a shoulder for preventing axial displacement of the further roller.

In some embodiments, the roller flange comprises a torque transmitter, such as a pulley or a gear, which is adapted to transmit a torque.

According to the improved connection concept, a roller flange according to one of the described embodiments can be used in an external rotor motor and/or in a conveyor roller.

In one embodiment of an external rotor motor with a roller flange according to the improved connection concept, the external rotor motor comprises the roller, which is designed, for example, as a rotor or external rotor of the external rotor motor. The roller flange is mounted on an end face of the roller of the external rotor motor. The roller is driven electrically, in particular by the external rotor motor. The at least one pin of the roller flange transmits a torque from the roller to the roller flange.

In one embodiment of a non-electric conveyor roller with a roller flange in accordance with the improved connection concept in an implementation with a torque transmitter, the conveyor roller comprises a roller. The roller flange is mounted on an end face of the roller. The roller flange is configured to be driven by an external drive, such as an external rotor motor, by means of the torque transmitter, for example by means of a belt or gear wheel attached to the torque transmitter. The at least one pin of the roller flange transmits a torque from the roller flange to the roller.

In one embodiment of an electric conveyor roller with a roller flange according to the improved connection concept, the conveyor roller comprises an external rotor motor, a first roller, which is designed for example as a rotor or external rotor of the external rotor motor, and a second roller, which is arranged concentrically to the first roller. The roller flange is mounted on an end face of the first roller of the external rotor motor. Furthermore, the first roller is driven by the external rotor motor. The at least one pin of the roller flange transmits a torque from the first roller to the roller flange. The roller flange transmits the torque of the first roller to the second roller.

In a further development of such an electric conveyor roller, the roller flange comprises at least one pin-like fixing element for fixing the second roller and a shoulder for preventing axial displacement of the second roller.

In an alternative or additional embodiment of such an electric conveyor roller, the roller flange comprises a torque transmitter as explained above, such as a pulley or a gear wheel, which is configured to transmit a torque. The conveyor roller is configured to transmit torque to at least one or more non-electric conveyor rollers of a roller conveyor by means of the torque transmitter on the roller flange, for example by means of a belt or a gear wheel attached to the torque transmitter.

This makes it possible, for example, to realize a roller conveyor with several electric and non-electric conveyor rollers.

BRIEF DESCRIPTION OF THE DRAWINGS

The improved connection concept is explained in more detail below with reference to the drawings using examples of embodiments. Similar elements or elements with the same functions are designated with the same reference signs. Therefore, a repeated explanation of individual elements is not necessary. The embodiment examples serve to explain and not to delineate the improved connection concept.

It shows, partly simplified.

DETAILED DESCRIPTION

Figure 1:
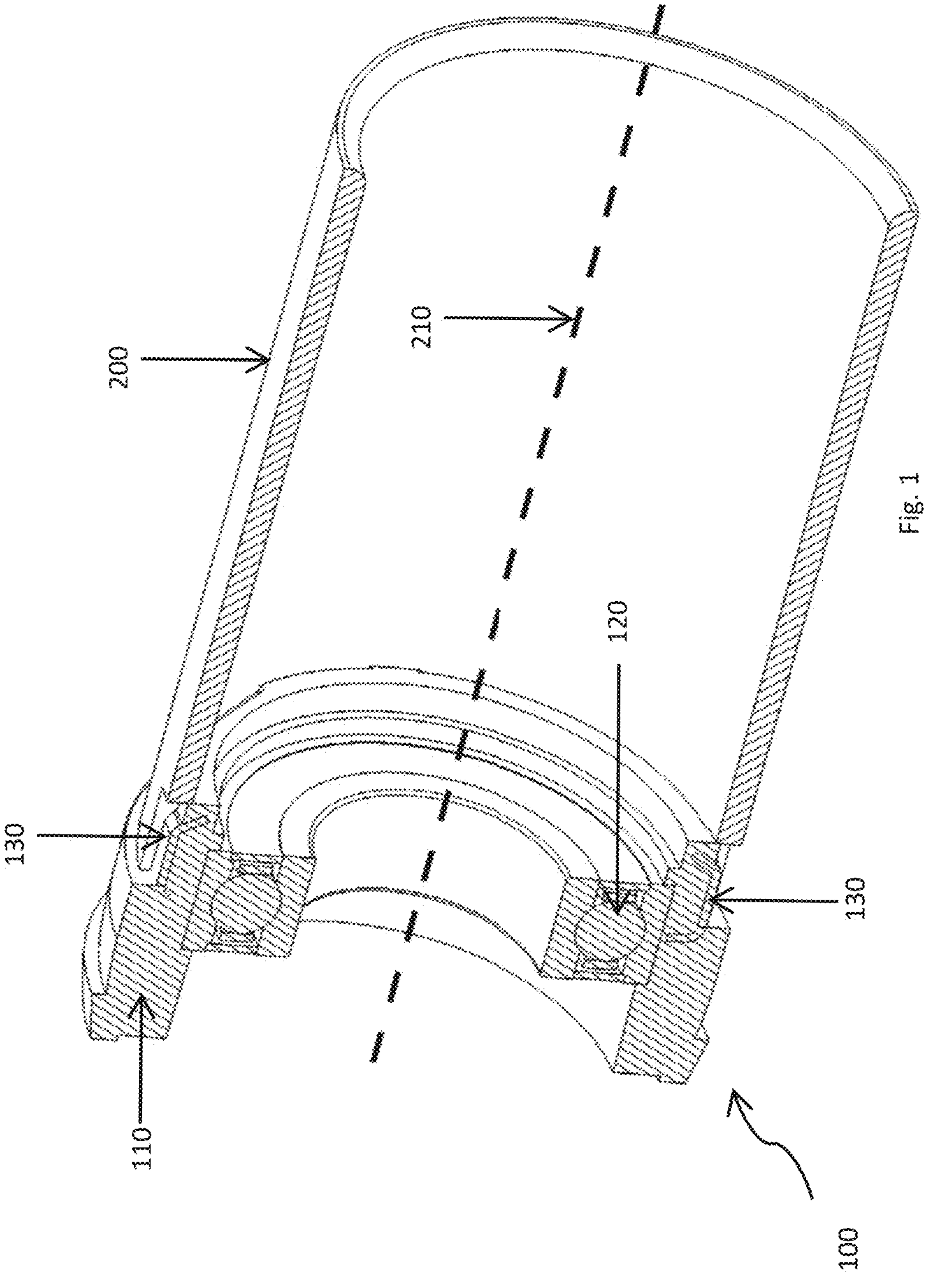
FIG. 1 a sectional view of an example embodiment of a roller flange mounted on an end face of a roller.

FIG. 1 shows one embodiment of a roller flange 100 for mounting on an end face of a cylindrical or cylindrical roller 200, which comprises a substantially annular plastic body 110, a bearing 120, and a metallic ring 130 surrounding the bearing 120. Only a part of the metallic ring 130 is visible here.

Figure 2B:
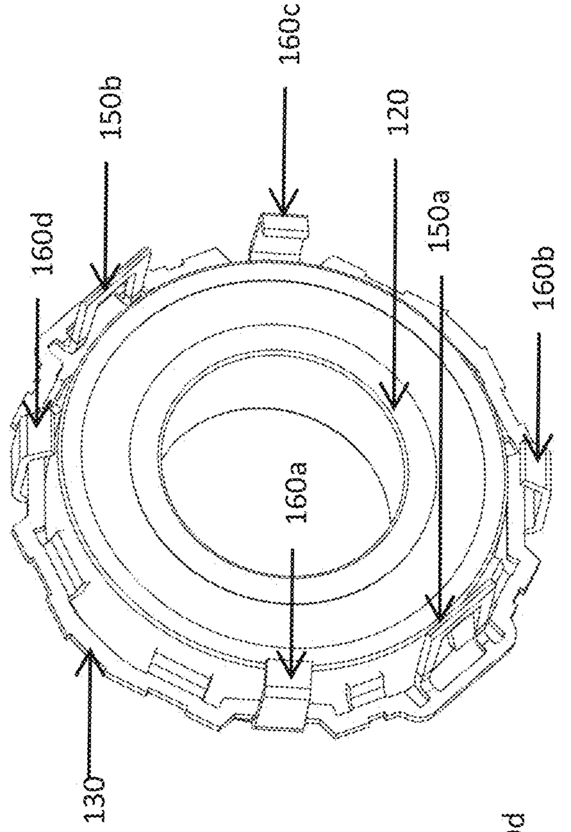
FIG. 2*b* an example embodiment of a non-overmolded roller flange.
Figure 2C:
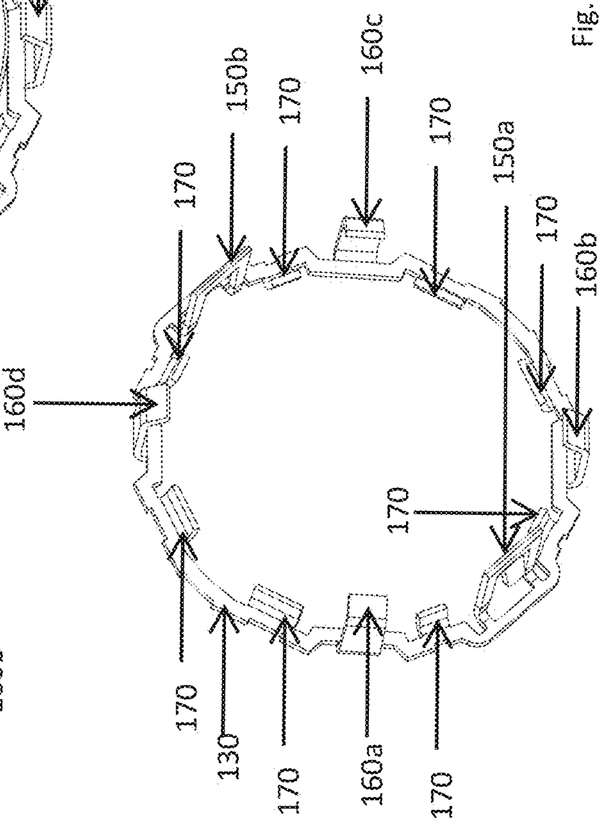
FIG. 2*c* an example embodiment of a metallic ring of the roller flange.
Figure 2A:
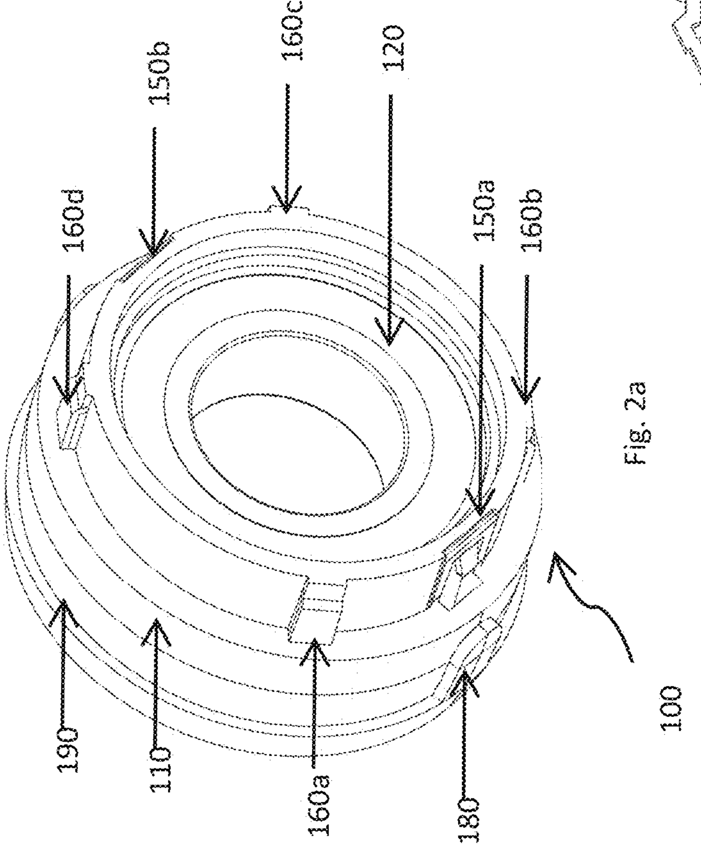
FIG. 2*a* an example embodiment of a roller flange.

FIGS. 2*a* to 2*c* show a roller flange 100 according to the improved connection concept in various views. FIG. 2*a* shows the roller flange 100, which comprises a plastic body 110 and a bearing 120, whereby a metallic ring 130 (only visible in FIG. 2*b* and FIG. 2*c*) is molded through the plastic body 110.

The roller flange 100 has elements for force transmission which are positioned distributed on or on a surface, in particular the circumferential surface, of the plastic body 110 and are parts of the metallic ring 130. In FIG. 2*b* and FIG. 2*c* embodiments for such elements for force transmission are shown. On the one hand, the metallic ring 130 comprises one or more locking means 150*a*, 150*b* for transmitting an axial force between the roller 200 and the roller flange 110. On the other hand, the ring 130 comprises one or more pins 160*a*, 160*b*, 160*c*, 160*d* for transmitting a radial force between the roller 200 and the roller flange 110.

The elements for force transmission protrude from the outer surface of the plastic body 110 after overmolding of the metallic ring 130.

For example, the metallic ring 130 is pushed onto the bearing 120 by one or more elastic attachment means 170. This allows the ring 130 to be attached to the bearing 120 before overmolding with plastic. For example, the attachment means can be shaped as legs that hold the ring centered on the outer ring of the bearing.

Figure 3:
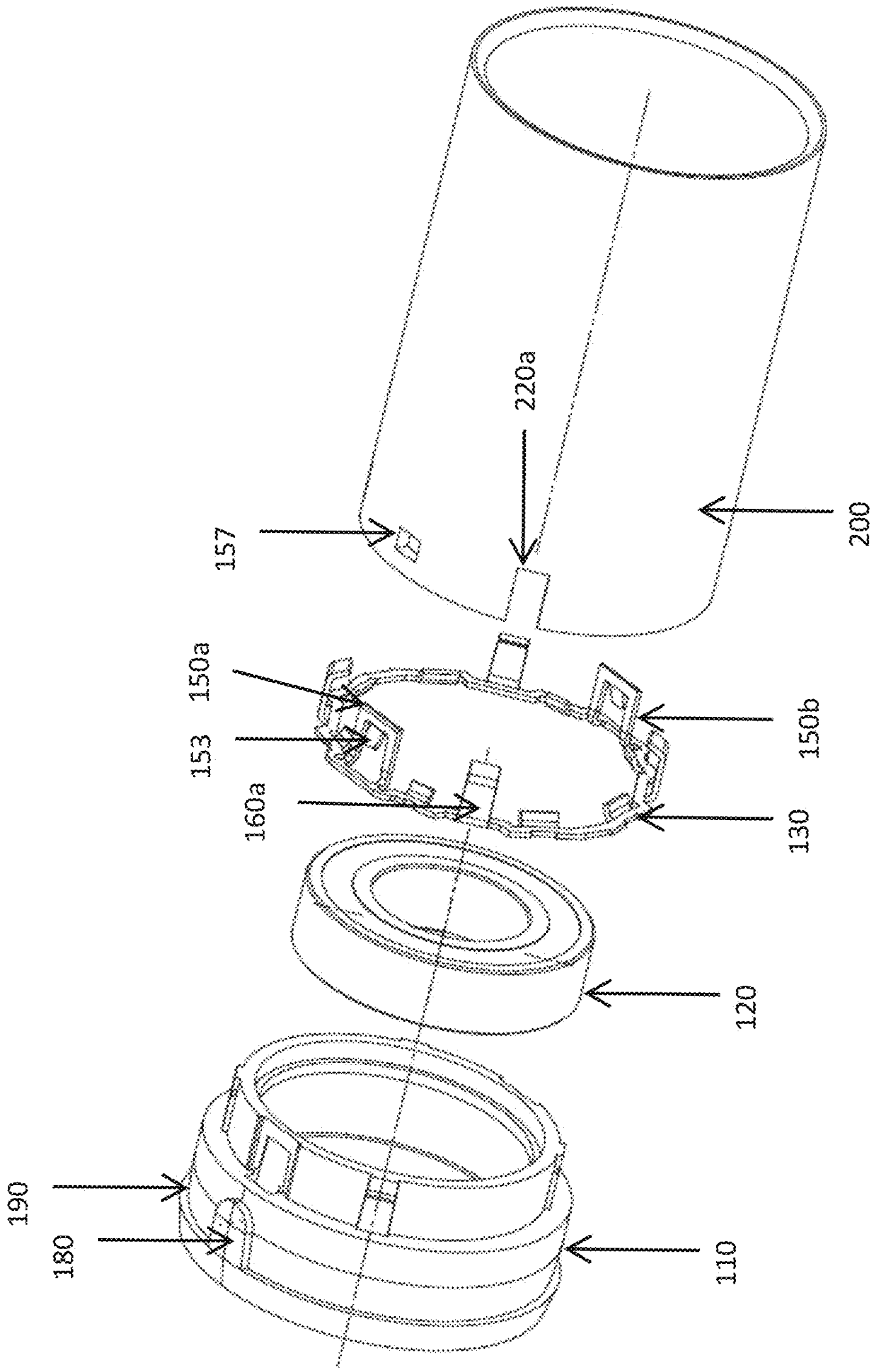
FIG. 3 an exploded view of a roller with roller flange.

FIG. 3 shows an exploded view of a roller flange 100 mounted on the end face of the roller 200. The metallic ring 130 comprises the locking means 150*a*, 150*b* for the transmission of an axial force between the roller 200 and the roller flange 110. After overmolding, the metallic ring 130 is essentially located in the plastic overmolding. Only the elements for force transmission protrude beyond it.

In the embodiment in FIG. 3, the locking means 150*a*, 150*b* are shaped like a bracket and have a latching means 153 for latching into an opening or groove 157 of the roller, in particular in the form of a hook.

In the embodiment in FIG. 3, the one or more pins 160*a*, 160*b*, 160*c*, 160*d* of the roller flange form a positive connection with corresponding recesses 220*a* of the roller 200. The connection is used to transmit a radial force between roller flange 100 and roller 200.

Figure 4:
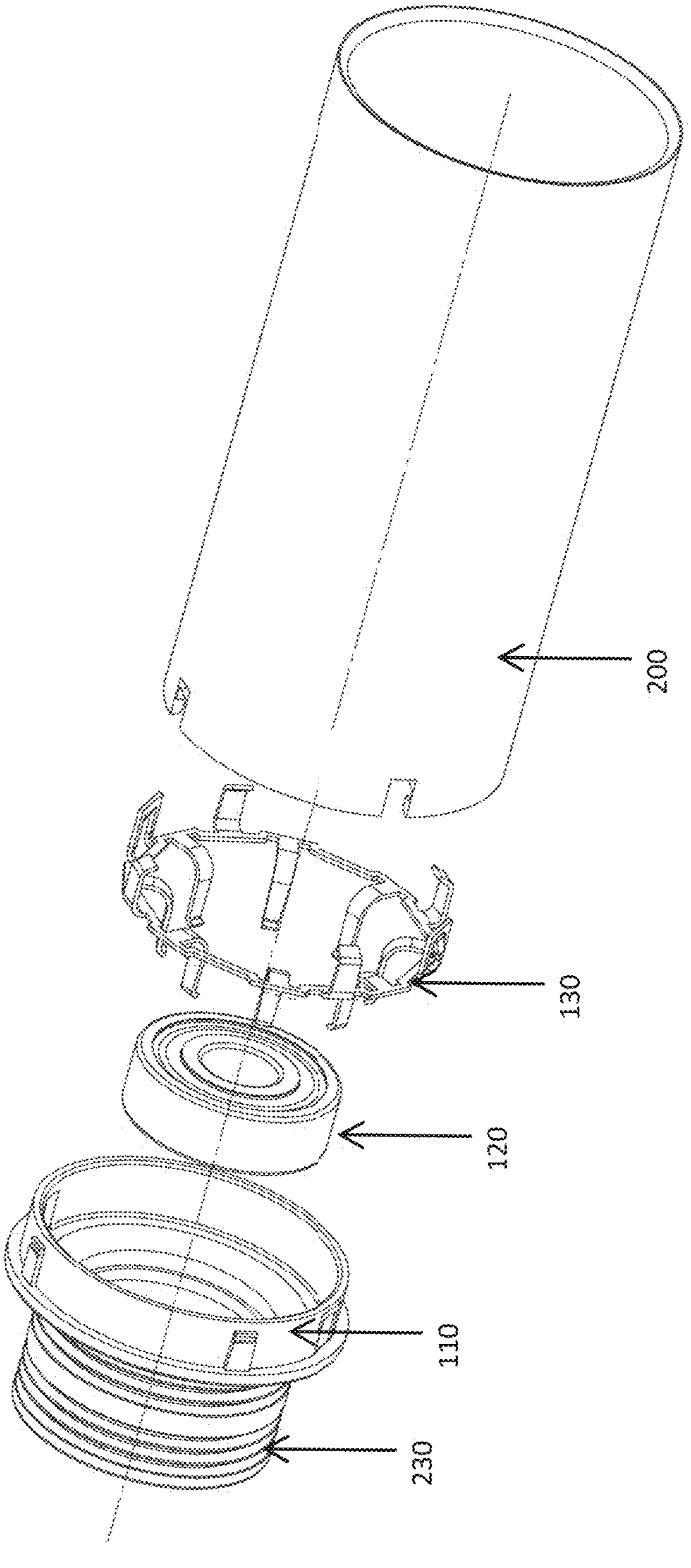
FIG. 4 an exploded view of an example embodiment with a roller flange and a torque transmitter.

FIG. 4 shows a roller flange 100 according to the improved connection concept in a further embodiment with a torque transmitter 230. The torque transmitter 230 is realized, for example, as a pulley, but could also be realized by a toothed wheel or the like. The torque transmitter 230 is part of the plastic body 110 of the roller flange 100. The same overmolding process that embeds the ring 130 and the bearing 120 in the plastic body can also form the torque transmitter 230. Only a single overmolding process is then required. The torque transmitter 230 is made of the same plastic as the plastic body.

Figure 5B:
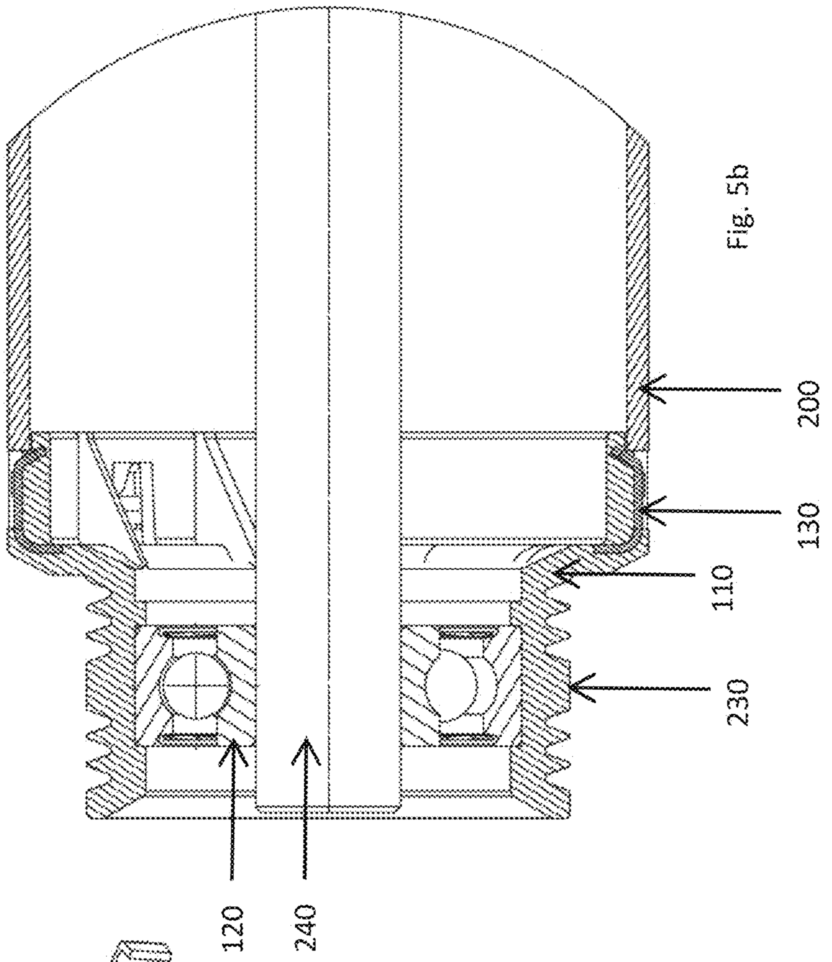
FIG. 5*b* a cross-section of an example embodiment of a roller flange with torque transmitter.
Figure 5A:
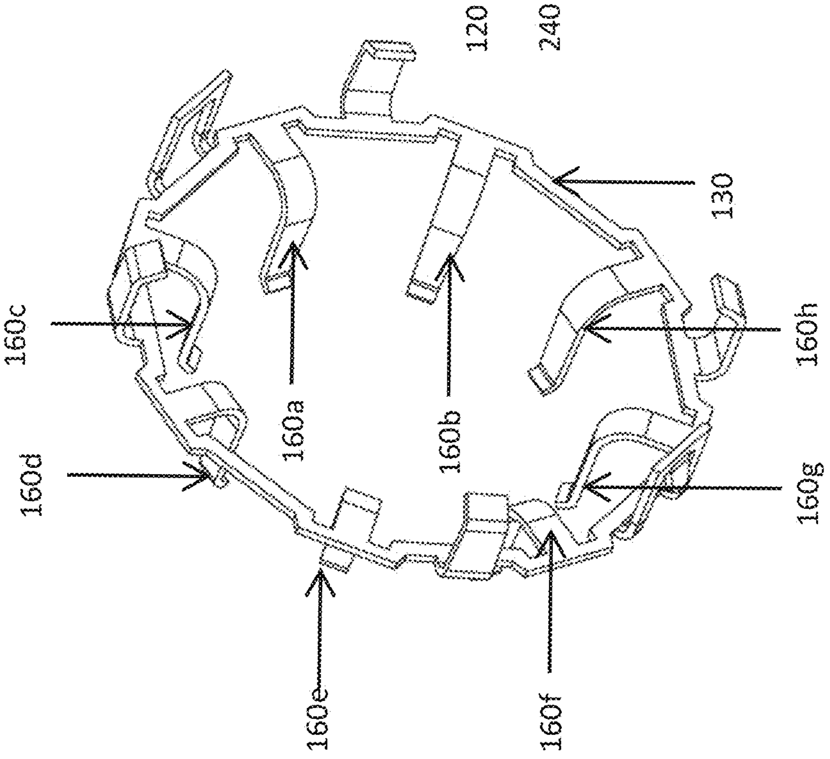
FIG. 5*a* a detail of an example embodiment of a metallic ring for a roller flange with a torque transmitter.

FIG. 5*a* shows an embodiment of a ring 130 for a roller flange 100 with torque transmitter 230. In contrast to the embodiment in FIG. 2*c*, the elastic attachment means 160*a*-160*h* are extended in order to increase the distance between the bearing 120 and the roller 200. As a result, the bearing 120 is located in the area below the torque transmitter 230 and can better dissipate the forces occurring in this area.

FIG. 5*b* shows a cross-section of this embodiment. The plastic body 110 comprises a section that is shaped, for example, as a pulley-like torque transmitter 230. For example, the torque transmitter can transmit force to one or more V-belts.

Figure 6:
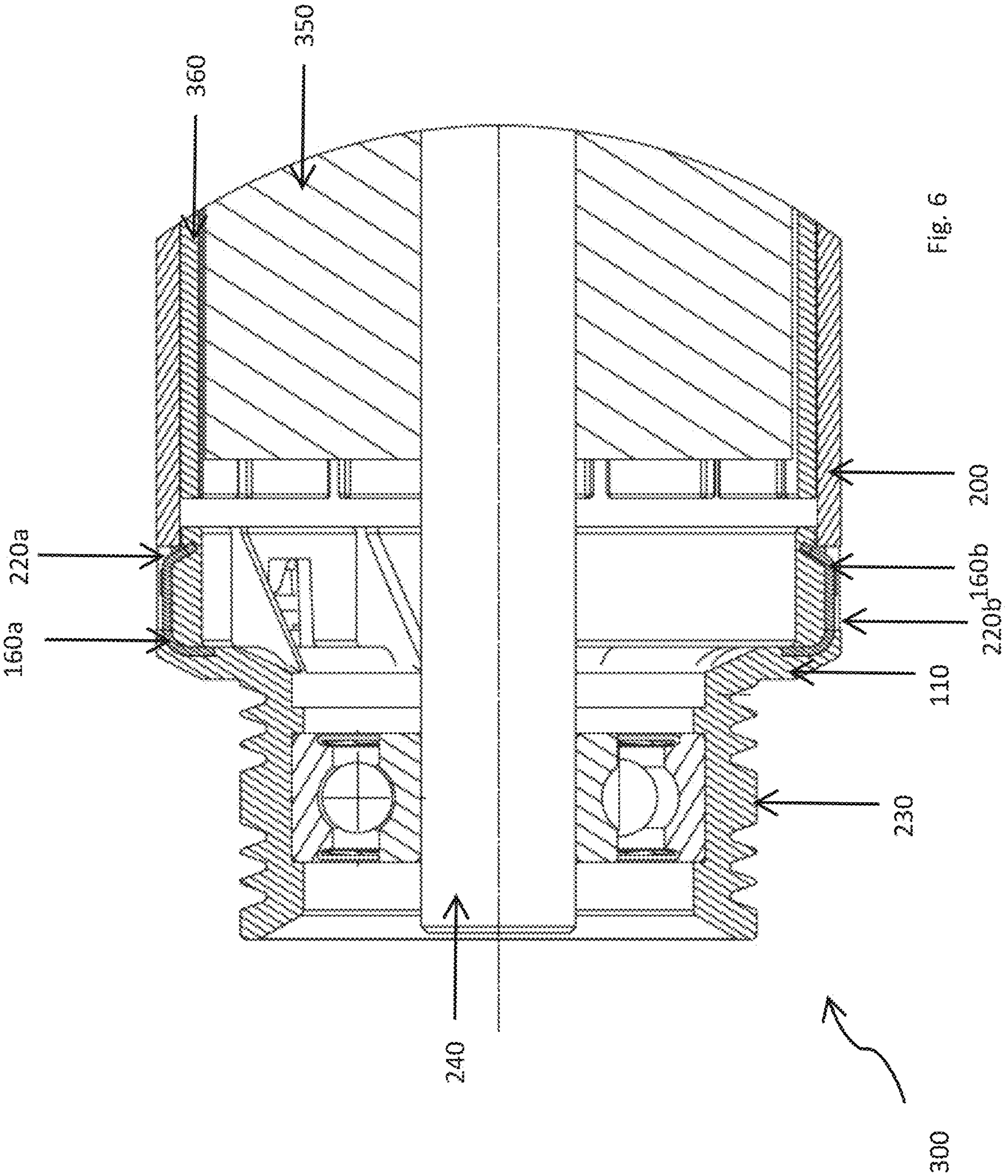
FIG. 6 an example embodiment of an external rotor motor with a roller flange.

FIG. 6 shows an application of a roller flange 100 according to the improved connection concept in an external rotor motor 300. In a conventional design, an external rotor motor 300 comprises a rigid axle 240 with a stator 350 and a rotor 360, which rotates around the stator. The rotor 360 is a cylindrical roller or is non-rotatably connected to such a roller. The rotor 360 thus represents a first roller 200 in the sense of the improved connection concept. This allows the roller flange 100 to be connected at the end face to the rotor 200 of the external rotor motor, which is designed as a first roller. The torque of the electrically driven rotor 200 is transmitted from the rotor or the roller 200 to the plastic body 110 of the roller flange 100 via the one or more pins 160*a*, 160*b* of the ring of the roller flange that form a positive connection with corresponding recesses 220*a* and 220*b* of the roller 200.

In addition, the locking means 150*a*, 150*b* (not visible in FIG. 6) secure the connection between the roller flange 100 and the rotor 200 against axial forces and a loosening of the roller flange 100 from the rotor 200.

Figure 7:
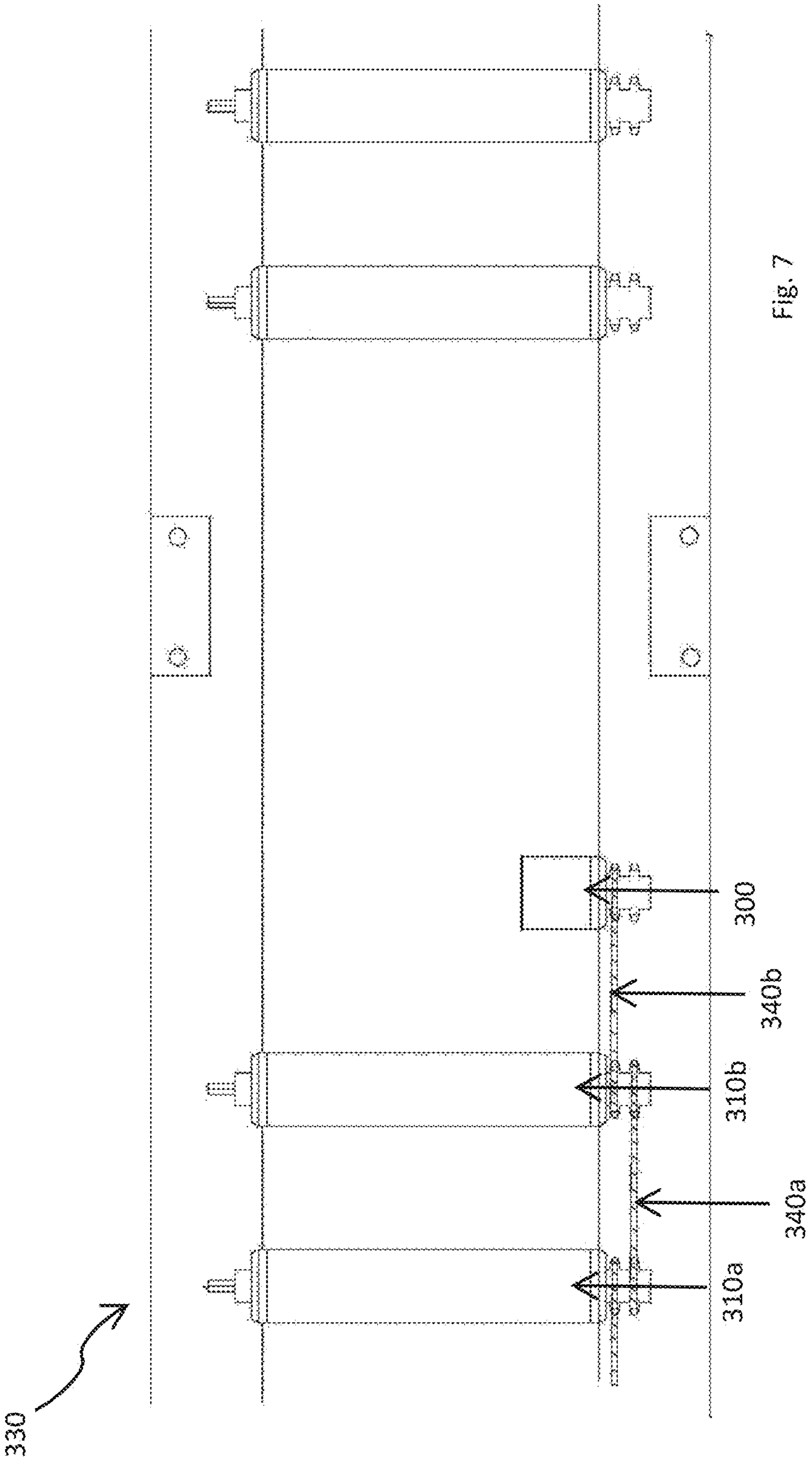
FIG. 7 an example embodiment of a roller conveyor with an external rotor motor and non-electric conveyor rollers.

By using the roller flange 100 with a torque transmitter 230 on an external rotor motor 300, the external rotor motor 300 can drive other non-electric conveyor rollers 310*a*, 310*b* in a roller conveyor system 330 via one or more belts 340*a*, 340*b* (see FIG. 7).

Figure 8:
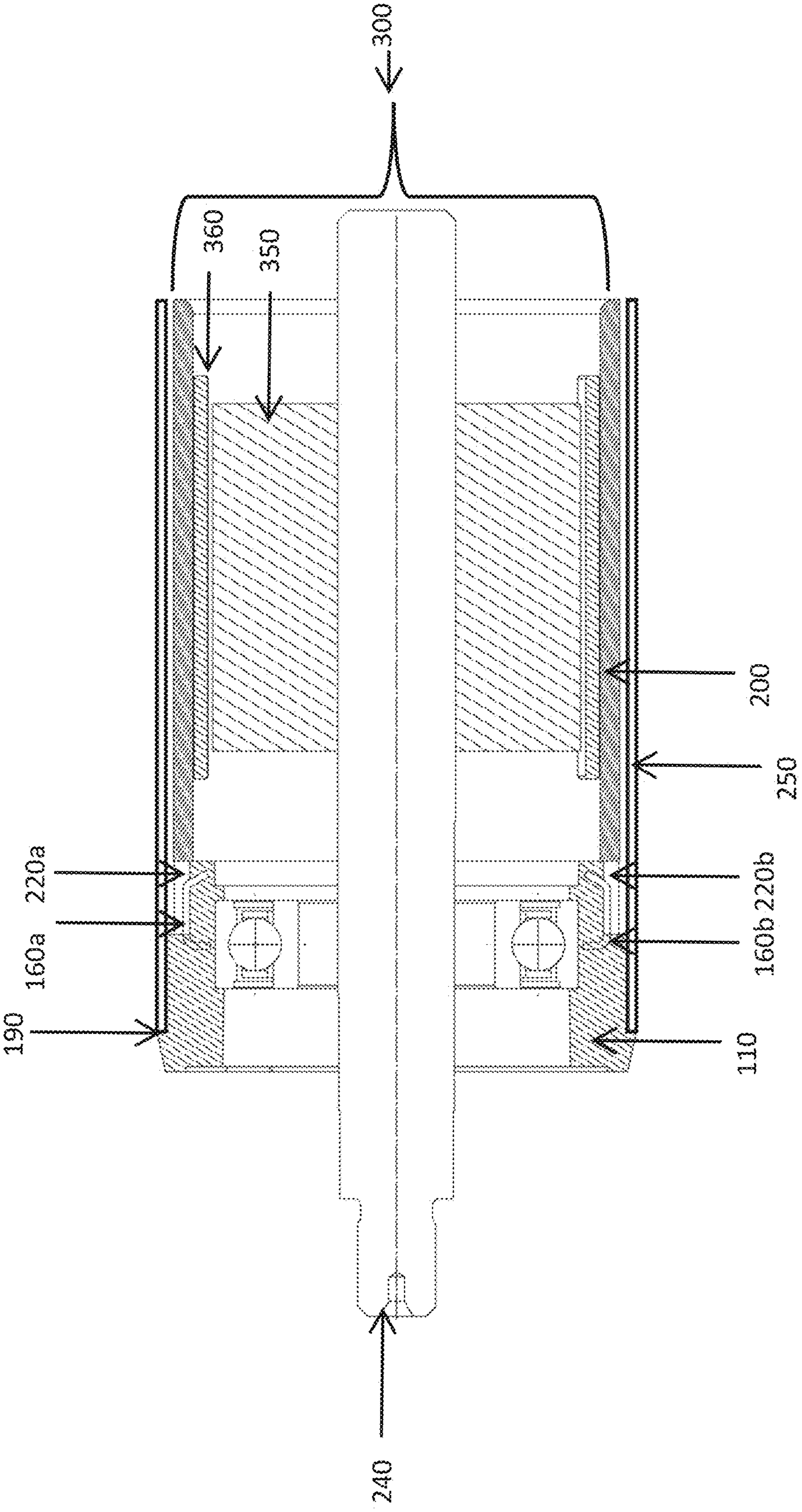
FIG. 8 an example embodiment of an electric conveyor roller with an external rotor motor.

In another embodiment according to the improved connection concept, the external rotor motor 300 is part of an electric conveyor roller 320. FIG. 8 shows such an embodiment. The electric conveyor roller 320 with a roller flange 100 comprises an external rotor motor 300, a first roller 200, in particular as a rotor 360 or external rotor of the external rotor motor 300, wherein the roller flange is mounted on an end face of the first roller 200 of the external rotor motor, wherein the first roller 200 is driven by the external rotor motor. The torque of the first roller 200 is transmitted from the first roller 200 to the roller flange 100 via the one or more pins 160*a*, 160*b*, 160*c*, 160*d* of the roller flange.

The electric conveyor roller 320 also comprises a further, second roller 250, which is in contact with a product to be conveyed. This second roller 250 is also connected to the roller flange 100. For this purpose, the roller flange has a shoulder 190 with a stop. The second roller 250 is pushed onto this shoulder 190 and is in contact with the stop in order to prevent axial displacement of the second roller. The second roller is concentric with the first roller 200 and is connected to the roller flange in a rotationally fixed manner, so that the torque of the roller flange 100 can be transmitted to the second roller 250. In this embodiment, the second roller 250 surrounds the first roller 200, at least partially.

In a further embodiment, the roller flange 100 has at least one pin-like fixing element 180 (see FIG. 3) for fixing the second roller 250, which additionally secures the second roller 250 against radial rotation relative to the roller flange. In FIG. 3, the second roller 250 is not shown, as it would otherwise obscure the details of the underlying elements.

Figure 9:
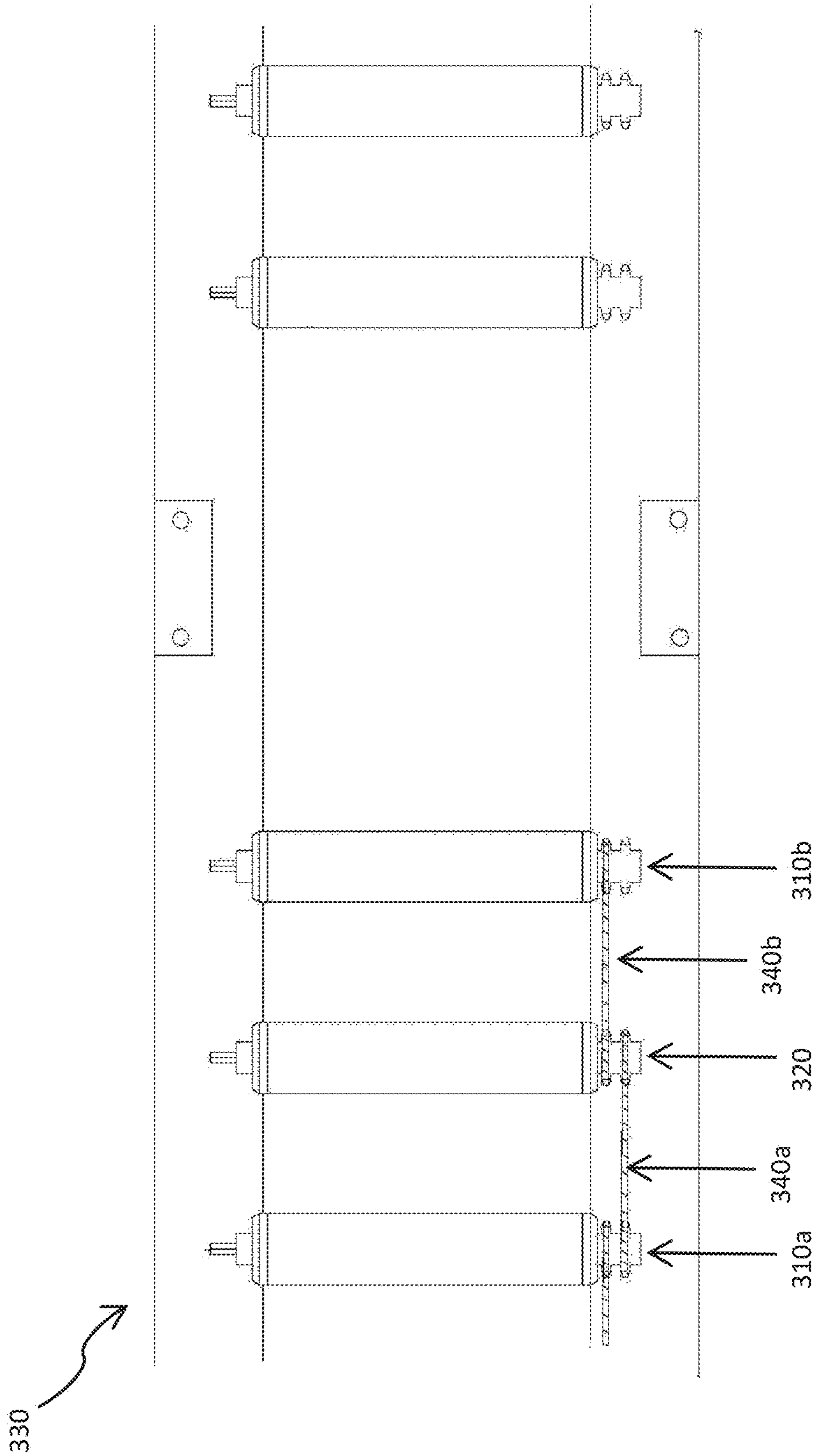
FIG. 9 an example embodiment of a roller conveyor with electric and non-electric conveyor rollers.

In a further embodiment, an electric conveyor roller 320 is equipped with a roller flange with a torque transmitter 230. With the aid of one or more belts 340*a*, 340*b*, other non-electric conveyor rollers 310*a*, 310*b* in a roller conveyor system 330 can be driven by the electric conveyor roller 320 (see FIG. 9).

Figure 10:
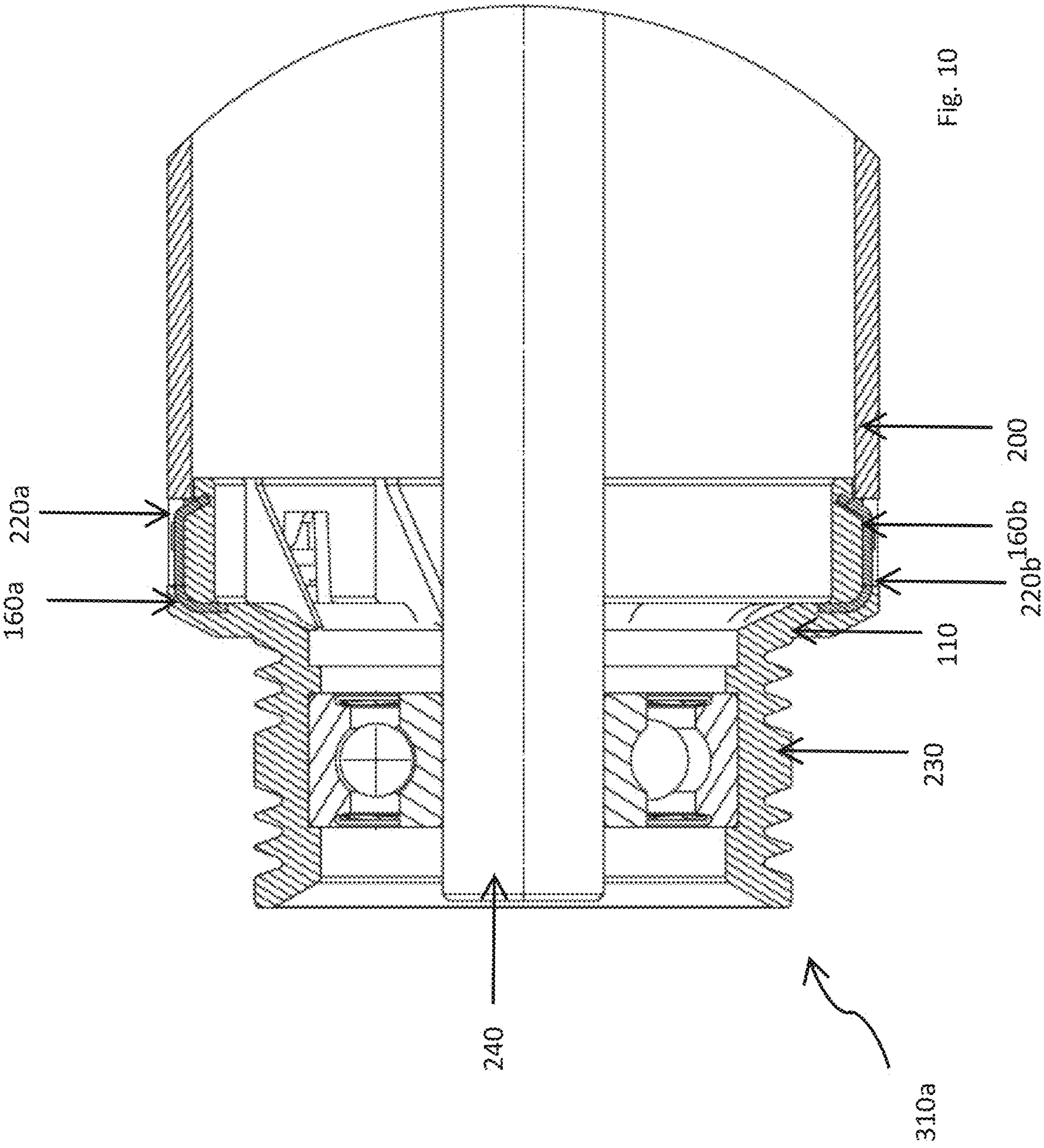
FIG. 10 an example embodiment of a non-electric conveyor roller.

In a further embodiment, the roller flange 100 can also be used in a non-electric conveyor roller 310*a*, as shown in FIG. 10. The structure of the non-electric conveyor roller is identical to FIG. 6 except for the missing external rotor motor. The non-electric conveyor roller 310*a* is driven, for example, by an external rotor motor 300 or an electric conveyor roller 320 with the aid of belts 340*a*, 340*b* via the torque transmitter 230. The torque is transmitted from the roller flange 100 to the first roller 200 via the roller flange and the one or more pins 160*a*, 160*b* of the roller flange.

In a further embodiment, the roller flange 100 has one or more locking means 150*a*, 150*b* for transmitting an axial force between the first roller 200 and the roller flange 100 for axially locking the first roller to the roller flange 100.

What is claimed is:

1. A roller flange for mounting on an end face of a roller having a cylindrical shape or a tubular shell shape, the roller flange comprising:
- an annular plastic body;
- a bearing; and
- a metallic ring surrounding the bearing;
- wherein:
  - the metallic ring and the bearing are at least partially embedded in the annular plastic body, wherein the metallic ring is partially molded over by the annular plastic body;
  - the metallic ring has elements for force transmission which are positioned on or distributed over a circumferential surface of the annular plastic body; and
  - the elements for force transmission comprise:
    - at least one locking means for transmitting an axial force between the roller and the roller flange, and axially locking the roller to the roller flange; and
    - at least one pin configured to transmit or a torque in either direction between the roller and the roller flange, including the torque being applied to the roller flange by an external drive, and the torque being applied to the roller.

2. The roller flange according to claim 1, wherein the at least one pin of the roller flange is arranged to form a positive connection with at least one corresponding recess of the roller.

3. The roller flange according to claim 1, wherein the ring, the bearing and the annular plastic body are arranged coaxially to an axis of rotation of the roller.

4. The roller flange according to claim 1, wherein the ring is slipped onto the bearing.

5. The roller flange according to claim 4, wherein the ring comprises at least one resilient push-on means, which is in contact with the bearing.

6. The roller flange according to claim 1, wherein the roller flange comprises at least one fixing element for fixing a further roller and a shoulder for preventing axial displacement of the further roller.

7. The roller flange according to claim 1, wherein the roller flange comprises a torque transmitter, which is configured to transmit a torque.

8. The roller flange according to claim 7, wherein the torque transmitter is a pulley or a gear wheel.

9. The roller flange according to claim 1, wherein the elements for force transmission protrude from the metallic ring through the circumferential surface of the overmolded annular plastic body.

10. An external rotor motor with a roller flange according to claim 1, comprising the roller, which comprises a rotor or external rotor of the external rotor motor, wherein
- the roller flange is mounted on an end face of the roller of the external rotor motor;
- the roller is electrically driven; and the at least one pin of the roller flange transmits a torque from the cylindrical or drum-shaped roller to the roller flange.

11. An electric conveyor roller with a roller flange according to claim 1, the electric conveyor roller comprising
an external rotor motor;
a first roller, which is designed in particular as a rotor or external rotor of the external rotor motor; and
a second roller, which is arranged concentrically to the first roller; wherein
the roller flange is mounted on an end face of the first roller of the external rotor motor;
the first roller is driven by the external rotor motor;
the at least one pin of the roller flange transmits a torque from the first roller to the roller flange; and
the roller flange transmits the torque of the first roller to the second roller.

12. The electric conveyor roller according to claim 11, wherein
the roller flange comprises a torque transmitter, which is configured to transmit a torque; and
the conveyor roller is configured to transmit torque by means of the torque transmitter to at least one non-electric conveyor roller of a roller conveyor.

13. The electric conveyor roller according to claim 11, wherein the roller flange comprises at least one fixing element for fixing the second roller and a shoulder for preventing axial displacement of the second roller.

14. A non-electric conveyor roller comprising:
a roller having a cylindrical shape or a tubular shell shape; and
a roller flange for mounting on an end face of the roller, the roller flange comprising:
an annular plastic body;
a bearing; and
a metallic ring surrounding the bearing;
wherein:
the metallic ring and the bearing are at least partially embedded in the annular plastic body, wherein the metallic ring is partially molded over by the annular plastic body;
the metallic ring has elements for force transmission which are positioned on or distributed over a circumferential surface of the annular plastic body; and
the elements for force transmission comprise:
at least one locking means for transmitting an axial force between the roller and the roller flange, and axially locking the roller to the roller flange; and
at least one pin configured to transmit a torque in either direction between the shaped roller and the roller flange, including the torque being applied to the roller flange by an external drive and the torque being applied to the roller;
wherein the roller flange comprises a torque transmitter configured to transmit the torque,
wherein
the roller flange is arranged to be driven by the external drive via the torque transmitter, and wherein
the at least one pin transmits the torque from the roller flange to the roller.

15. The non-electric conveyor roller according to claim 14, wherein the elements for force transmission protrude from the metallic ring through the circumferential surface of the overmolded annular plastic body.

* * * * *